United States Patent [19]
Davis

[11] Patent Number: 4,974,360
[45] Date of Patent: Dec. 4, 1990

[54] CONTINUOUS TORQUE FLY SWATTER

[76] Inventor: Richard L. Davis, 171 Lucero Way, Menlo Park, Calif. 94028

[21] Appl. No.: 409,622

[22] Filed: Sep. 19, 1989

[51] Int. Cl.⁵ .......................... A01M 3/00; A01M 5/00
[52] U.S. Cl. ......................................................... 43/135
[58] Field of Search .......................................... 43/135

[56] References Cited

U.S. PATENT DOCUMENTS

| | | | |
|---|---|---|---|
| 1,155,697 | 10/1915 | Anderson | 43/135 |
| 1,179,114 | 4/1916 | Laubenstein | 43/137 |
| 1,479,046 | 1/1924 | Koontz | 43/137 |
| 1,515,158 | 11/1924 | Miller | 43/135 |
| 1,591,870 | 7/1926 | Wood | 43/137 |
| 1,639,292 | 8/1927 | Hendrickson et al. | 43/135 |
| 1,861,688 | 6/1932 | Crawford | 43/135 |
| 2,189,360 | 2/1940 | Haviland | 43/135 |
| 3,197,917 | 8/1965 | Schroeder | 43/135 |
| 3,292,299 | 12/1966 | Mettler | 43/135 |
| 3,308,571 | 3/1967 | Jones | 43/135 |
| 3,871,125 | 3/1975 | Wilson et al. | 43/135 |

*Primary Examiner*—Richard K. Seidel
*Assistant Examiner*—Rex Pelto

[57] ABSTRACT

Spring-powered device for swatting flies and other insects has a swatting element pivotably connected to an elongated handle through two axially-aligned helical springs interposing the swatting element and handle. The springs, provided with protruding ends for connection purposes, perform the triple function of connecting the handle to the swatting element, powering the swat, and providing a pivot or hinge on which the swatting element pivots. The springs are oppositely-wound, one on a left-hand and one on a right-hand helix, thereby providing lateral balance to the swat. A sliding rod affixed to the handle performs the functions of restraining the swatting element against the action of the springs prior to the swat and of subsequently releasing it into its swatting arc under spring power. The springs' location immediately between the handle and the swatting element, combined with their pivot and powering functions, allows the swatting element of the device to pivot in a substantially full-circle arc under continuous torque force of the springs for the entire arc, thereby permitting it to make sharp contact with a swatting surface at any point in the arc.

12 Claims, 5 Drawing Sheets

CONTINUOUS TORQUE FLY SWATTER

BACKGROUND OF THE INVENTION

1. Field of the Invention

The present invention generally relates to fly swatters and, more particularly, is concerned with a spring-powered fly swatter.

2. Description of the Prior Art

Some fly swatters in the prior art which incorporate certain constituent elements described as springs are in fact swatters which are manually operated in the traditional mode but which incorporate a coiled-wire or other construction that contributes additional flexion to the swatter when swung by hand. These are not truly mechanically-operated or spring-powered devices. Examples of such inventions are found in the patents to Laubenstein, Koontz and Wood. U.S. Pat. No 1,179,114 (Apr. 11, 1916) to Laubenstein for a Fly Swatter teaches a manually operated device which utilizes a Z-shaped length of heavy wire bearing on both the handle and the swatting member to hold the two members in the same plane and to add flexion to the swatter as it is swung U.S. Pat. No. 1,479,046 (Jan. 1, 1924) to Koontz for a Fly Swatter describes a swatter formed substantially from wire, the frame portion having one side formed into coils denominated springs which are wrapped around the bent wire arms of the handle portion. The inventor's description of the function of the coiled wire portion is that of allowing a flexing action between the main body of the swatter and the handle when swung by hand, thereby preventing bending and fracturing of the wire frame at that point over a period of time. U.S. Pat. No. 1,591,870 (Jul. 6, 1926) to Wood for a Fly Swatter shows a manually-operated swatter comprised like Koontz's of two basic formed-wire parts, with a mesh screen held in place by a binding. The wire frame of the swatter head is coiled at each lower side about a triangular frame portion of the handle, at two separate points on each side, for the stated object of providing spring flexing ability and causing the swatter to return to its normal position after use.

In none of the above examples of prior art is the swatting element or head powered by the mechanical force of a spring; all are swung in the traditional manner of the manual fly swatter.

Fly swatters and similar devices which may truly be characterized as "mechanically operated", "automatic" or "spring-actuated" are also old in the art. All, however, teach mechanisms comprising a multiplicity of formed metal parts and elements such as frames, pivots, wheels, bars, pins, latches or bearings, requiring the use of metal forming equipment to fabricate and being expensive and time-consuming both to fabricate and to assemble.

More important, however, than the limitations of the prior art inventions in terms of manufacturing complexity and expense, is their relative lack of real utility. Most are bulky and intricate in operation. All are limited in their range of swatting arc and therefore their swatting power. Some are not even swatters in that they use a catching rather than swatting action. None of them solve the commonly experienced problem of frightening away the fly as a result of visible motion from the user and the device during the act of swatting. All of the above-related disadvantages will be seen more clearly in the ensuing descriptions of prior art patents known to this inventor.

The closest discovered art to the instant invention is found in U.S. Pat. No. 1,861,688 (June 7, 1932) to Crawford for a Fly Swatter. His device comprises a swatter head hinged on a handle and actuated by a spring element. However, Crawford teaches a hinge element which is discrete and at a distance from the spring element, with a bar of a smaller loop A1, A2 of the handle A rotating within a tubular portion B1 of a base or striking portion B, in journal bearing fashion. The separated spring element is a single spring wire coiled about the opposite side of loop A1, A2 and provided with a large central loop C at a right angle to its smaller loops on each side. As this central loop of the spring bears against base portion B, when released it drives the base upward and outward. Reference to Crawford's drawings reveals that, by virtue of loop segment A2 being located forward of loop segment A1 and its attached spring C during swatting action, the spring is impeded in its arc to a maximum of approximately 180 degrees. This limits the range of arc of the striking element B2 under spring tension to the same half circle. Crawford further teaches an extensive use of formed metal parts, principally including a wire loop handle A in which the use of wire or other flexible rod is essential to operation of the release mechanism because the handle's opposite sides must be compressed in order to release it from its catch B4 to initiate the swatting action. Thus Crawford's device will not operate with a handle that is solid or non-compressible.

U.S. Pat. No. 1,515,158 (Nov. 11, 1924) to Miller describes, as well as claims, an Insect Catcher and specifically denies and therefore does not teach a fly swatter. The object of the invention is not to swat insects, but to catch them on the fly. Miller shows an extremely complicated mechanism comprising many separate parts and elements, mostly of metal, requiring great expense in terms of the cost of fabrication and assembly. The inventor describes this as the "simple form" of his invention. The insect catching elements consist of two opposing frames 5 and 11 which open and close in clamshell-like fashion to a maximum of an approximate right angle, as described in the inventor's specification. Coiled springs 22 are wrapped around the back bars of top catching frame member 11, their spring tension holding member 11 in a closed position against fixed member 5. The function of the springs is to assist the user in opening and closing the moveable frame member 11 against the fixed member 5.

U.

U.S. Pat. No. 1,639,292 (Aug. 16, 1927) to Hendrickson and Roholt for a Fly Swatter also teaches a complicated mechanical swatter, hinged at a material distance from the end of its handle H by means of a metal plate 3 with a cam slot 5 through which is extended a finger 6 carried by the end portion of an operating rod R. The rod, lying parallel to handle H and positively affixed to the handle at both ends, is operated by alternately applying and releasing pressure on a hand grip 8 which is pivotally connected to the rod R and handle H. Operation of the rod, which actuates striking element 17, is assisted by a single coiled spring functioning as an extension spring which encircles the rod longitudinally for a portion of its length. The drawings show that the range of motion of the striking element is limited to less than 180 degrees by the physical structure of the device. The inventor specifies that an object of his invention is to swat flies upon a ceiling or at points otherwise beyond ordinary reach.

U.S. Pat. No. 1,155,697 (Oct. 5, 1915) to Anderson for a Fly Killing Apparatus teaches a complicated trigger-and-hammer operated device utilizing a multiplicity of interconnecting parts to lift and close a moving striking element 32 in clamshell-like action against a rigid striking element 27, for the object of killing insects while on the fly. A spring member 33 is coiled about a pin 29 to exert pressure upon the movable striking element 32 and thus hold it in a normally closed position with opposing portion 27. An actuating rod 38 is positively affixed to striking element 32 at its one end and to the trigger mechanism at the other, to provide a means for opening and closing the opposing striking elements by squeezing and releasing the trigger 15 and thus rocking the hammer 16. The drawings show that the structure of the device substantially limits the range of separation of the two striking elements. Striking element 32 pivots not on the handle 10 but upon extensions 24 of a bracket 23 affixed to arms 11 extending at an acute angle from handle 10.

U.S. Pat. No. 3,292,299 (Dec. 20, 1966) to Mettler for a Spring Actuated Fly Swatter teaches a complicated mechanism also incorporating a trigger element 24 which when squeezed places a swat arm 27 under the spring load of a coiled spring section of the arm so as to impel the entire swat arm and swat pad 46 into the swatting motion. The swat arm is not spring loaded when the arm and trigger are in the cocked position but must be so loaded by squeezing the trigger 24. A separate return spring 37 is utilized for automatically returning the swat arm and trigger to the cocked position. A third spring 57, helical compression type, is seated in the handle and exerts an outward pressure on a latch member 42 to hold catch members 45 in engagement with the shoulders 28 and 29 of the swat arm 27 prior to triggering. The entire swat arm moves in the swatting arc until impeded by the structure of the spring as well as the handle, which limits the swat pad's maximum range of arc to substantially less than 180 degrees.

U.S. Pat. No. 3,871,125 (Mar. 18, 1975) to Wilson for a Mechanical Fly Swatter also discloses a mechanically intricate device in which the entire swatter arm 16 and swatter head or pad 14 are swung as a unit, as in Mettler. The actuating mechanism utilizes a frame assembly 20, an anchor block 24, and a pivot wheel 48 mounted on a hub 50 with a pivot pin 52. A trigger element 60 through its finger release extension 66 is biased in a counterclockwise direction by a return spring 68, thereby holding a latch pin 62 in a notch 58 in the rim of the pivot wheel. Depression of the finger release extension 66 displaces the trigger element 60 in a clockwise direction against the bias of return spring 68 in order to withdraw the latch pin 62 from the notch 58. An elongated coil spring 72, extension type, is attached to and aligned longitudinally with the frame assembly and extended about the pivot wheel 48 so that its loop end 74 is positively connected to the swatter arm 16, which is anchored to the pivot wheel 48. When the actuating latch pin 62 is withdrawn by depression of the trigger element 60, the spring 72 angularly displaces the entire swatter pad and arm through a wide arc in order to swat the insect. The actuating spring force results from the tendency of the longitudinally aligned extension spring to return to its former contracted position after having been stretched by the clockwise rotation of the pivot wheel to cock the device. Wilson also teaches a second form of the invention in substantially the same construction except that the trigger member 102 is on the underside of the frame member and is actuated by squeezing.

As can be seen from a review of the above-cited prior art, devices heretofore which have utilized springs in the actuation of the swatting element, or swatting arm and element together, are complicated in structure and operation, composed of many separate parts, outdated in their extensive use of formed metal parts, expensive and time consuming to fabricate and assemble, restricted in their range of spring-powered torque and thus their effectiveness, and last but perhaps most importantly they do little to solve an age-old problem in successfully swatting flies: to minimize the visible motion of the user and the swatting device in order to avoid the fly taking flight before it can be struck.

While Crawford's fly swatter may be accurately described as spring-actuated, that is, the spring causing the swatting element to start into its motion under spring force, it does not have the capability to continue under full spring tension for a full-circle arc. Such capability would provide not only stronger swatting force during all stages of the arc but also the ability to swat under spring force at points past the limited spring-powered arc of Crawford's device.

Nor can the complexity and expense of fabrication be overemphasized as a drawback to the prior art inventions. In our modern era, ease and economy of manufacturing and assembling products is essential to controlling costs, producing goods at reasonable prices, and thereby competing effectively with offshore manufacturers. There has been a historical need for a more effective mechanical flyswatter made of few and economical parts which can be quickly and cheaply assembled. If only manual fly swatters can be economically produced, then only manual fly swatters will be used.

Consideration of the above disadvantages points to the obvious need for a device which successfully addresses all of these problems and yet can be manufactured, assembled, shipped and sold at a cost approximating that of a traditional manual fly swatter.

SUMMARY OF THE INVENTION

Accordingly, an object of my invention is to provide an economical spring-powered mechanical fly swatter which overcomes the aforementioned functional shortcomings of the prior art. A minimal number of parts are required: a swatting element, a spring-pivot element, and a handle with a simple restraint/release element. This results in substantial economy of fabrication and assembly, and thus ultimate economy to the fly-swatting consumer. The major parts of the preferred embodiment, the handle and swatting element, are best fabricated by modern mass production methods such as injection molding. Furthermore the entire device can be assembled in brief seconds, not only because of its few parts but due to their construction with suitable receptacle channels and slots.

In operation the swatting element moves independently of the handle with no extended swatting arm in an approximate maximum full-circle short-radius arc, remaining under spring tension during the entire arc. This result is achieved by locating the spring element immediately between the handle and swatting element and structuring it in such a way as to perform the triple function of a connecting member/pivot member/spring member. The result is not just a reduction in the number of required parts without loss of their separate functions, but an actual improvement in total function due to the resulting substantially full circle arc under continuous spring tension. To cock the device, the swatting element, which is at all times under spring tension, is manually rotated around the longitudinal axis of the spring element into a maximum spring tension position and is held there by means of a sliding restraint/release element affixed to the handle. The swatter is not swung at the insect but is slowly and stealthily slid toward it on a firm surface until within range of the fly, whereupon the restraint/release element is activated. An imperceptible retracting movement of the user's thumb permits the swatting element to snap quickly through a tight arc until impeded by the swatting surface. The only perceptible motion is the rapid, short-radius arc of the swatting element, at very close range to the fly. The effectiveness of the swat is increased from that of prior art devices since the arc radius is short and the swatting element retains its spring tension force throughout the full circle arc. This feature of continuous spring tension also permits the device to swat around corners to a distance equal to the length of the swatting element, and also permits it to be used to sweep the dead insect from a horizontal swatting surface immediately following the swat, by slightly lifting the swatter and allowing the spring-powered arc of the swatting element to continue.

Accordingly, the present invention relates to an improved spring-powered device for swatting flies and other insects, comprising an elongated handle, a swatting element positioned at one end of the handle and being connected thereto through an interposed, unitary spring-pivot element. The spring-pivot element when placed under maximum tension and released is disposed to impel the swatting element away from the plane of the handle on the pivot of the spring-pivot element in a rapid spring-powered arc causing the swatting element to make sharp contact with the insect on a surface adjacent.

Further objects and advantages of my invention will become apparent from a consideration of the drawings and ensuing description thereof.

DESCRIPTION OF THE PREFERRED EMBODIMENT

Description

Figure 1:
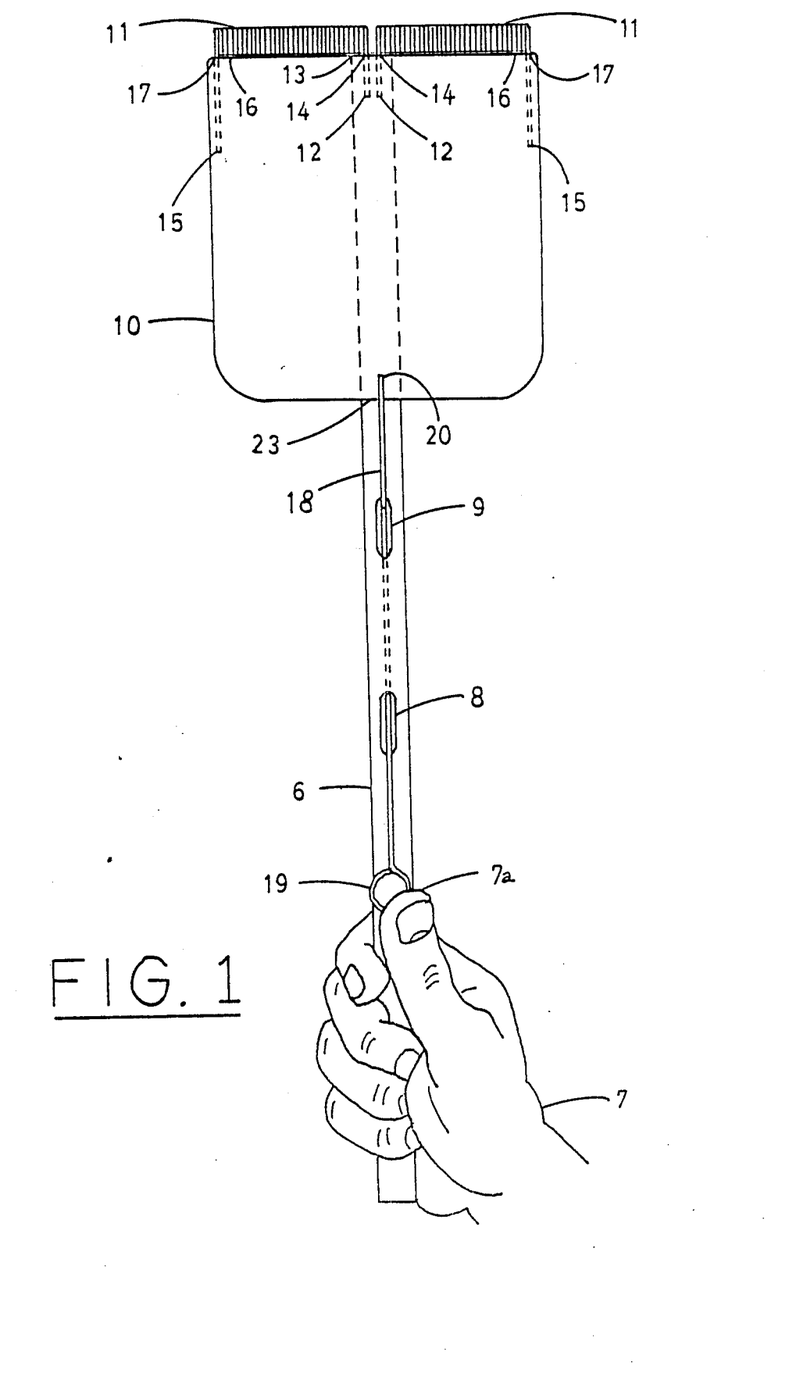
FIG. 1 is a top plan view of the preferred embodiment of the device, showing it in a cocked position of maximum spring tension.
Figure 2:
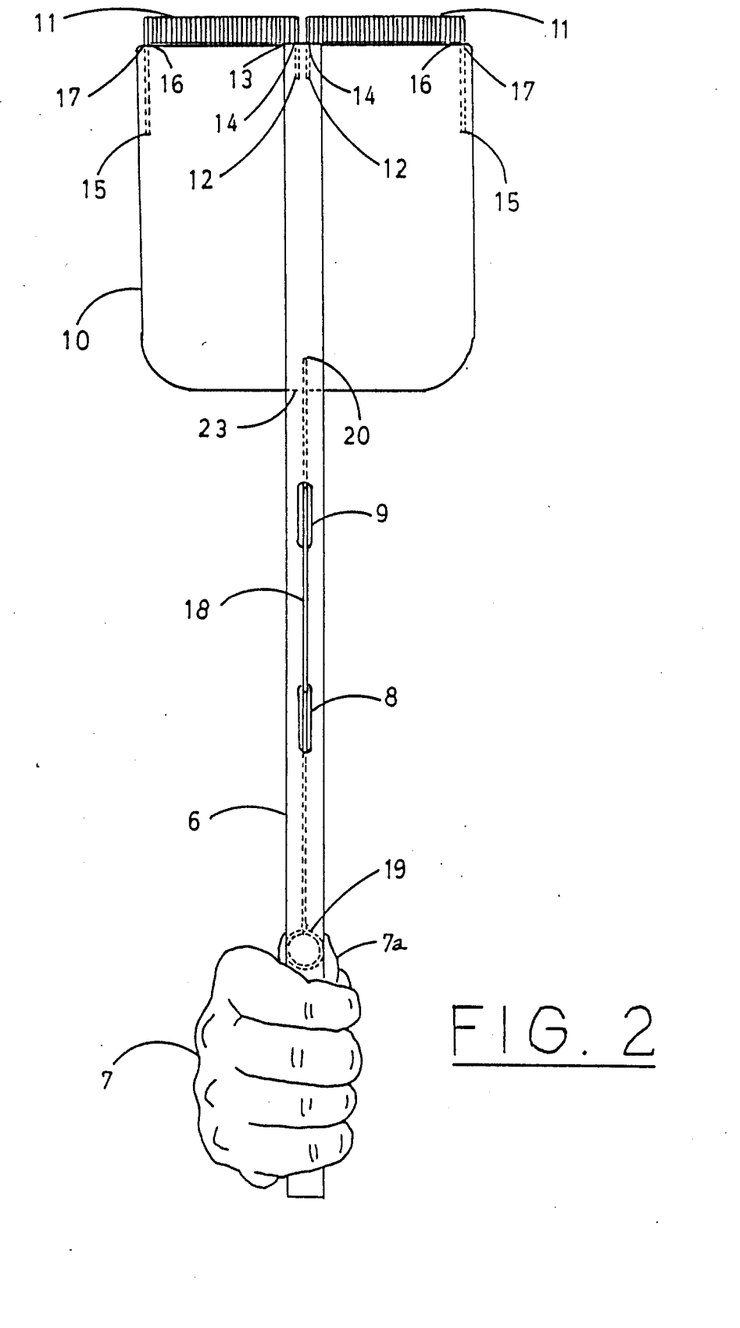
FIG. 2 is a bottom plan view showing the device in the same cocked position.

Referring now to the drawings, and particularly first to FIG. 1, there is seen the swatter of my invention in which the solid one-piece elongated handle 6, which may be composed of plastic, wood or other solid material, is held in position by the hand of the user shown diagramatically at 7 with the thumb at 7a. Handle 6 is provided with two longitudinally aligned narrow slots of limited length centered on its upper surface and extending through it. The slots are separated by a distance and lie parallel to the handle length, as seen at 8 and 9 of FIGS. 1, 2, 3 and 4.

The one-piece swatting element is seen at 10, which element may be of plastic, rubber or other suitable material. It may be solid throughout, as illustrated in the accompanying drawings, or may be perforated with an array of holes to reduce air resistance. A pair of helical springs 11 in axial alignment engage the handle 6 and the swatting element 10. The springs 11 are oppositely wound, that is, the direction of the helix on one spring is of the opposite hand from that of the other, one corresponding to a left-hand thread and the other corresponding to a right-hand thread. The springs 11 each have inner ends 12 which protrude for a short distance at an angle from the circumference of the spring helix, as seen most clearly in FIG. 5, and are removably embedded into the butt end 13 of handle 6 by means of receptacle channels 14. Springs 11 also have outer ends 15 which protrude for a distance at a tangent from the circumference of the spring helix, and are removably embedded into the butt end 16 of swatting element 10 by means of receptacle channels 17, also seen most clearly in FIG. 5. The springs 11 are immediately interposed and fixed between handle 6 and swatting element 10, also seen in FIG. 5 as well as in FIG. 3. Before connection of springs 11 to handle 6 and swatting element 10, torsion is applied to the springs, thereby placing them under permanent tension when so connected so that even in the uncocked position of FIG. 4 the swatting element 10 is automatically pressed against the underside of handle 6 under spring tension.

A restraint/release element consisting of a single elongated and formed rod 18 is centered on the handle 6 parallel to its length and passing through slots 8 and 9, as seen in FIGS. 1, 2, 3 and 4. As further seen in FIG. 1, the lower end of restraint/release rod 18 is formed into a small loop 19 for contact with the user's thumb 7a. At a distance away from loop 19 and in the direction of swatting element 10, the rod 18 is bent downwardly through slot 8 at an approximate right angle from the plane of loop 19 for a distance slightly exceeding the vertical thickness of handle 6 and thence is bent upwardly into parallelism with the length of handle 6 for an intermediate distance, whereupon it is bent again at an approximate right angle upwardly through slot 9 for a distance slightly exceeding the combined vertical thickness of handle 6 and swatting element 10, and is then bent away from loop 19 into approximate parallelism with the length of handle 6 for a short distance and terminating in a free end 20.

Operation

Figure 3:
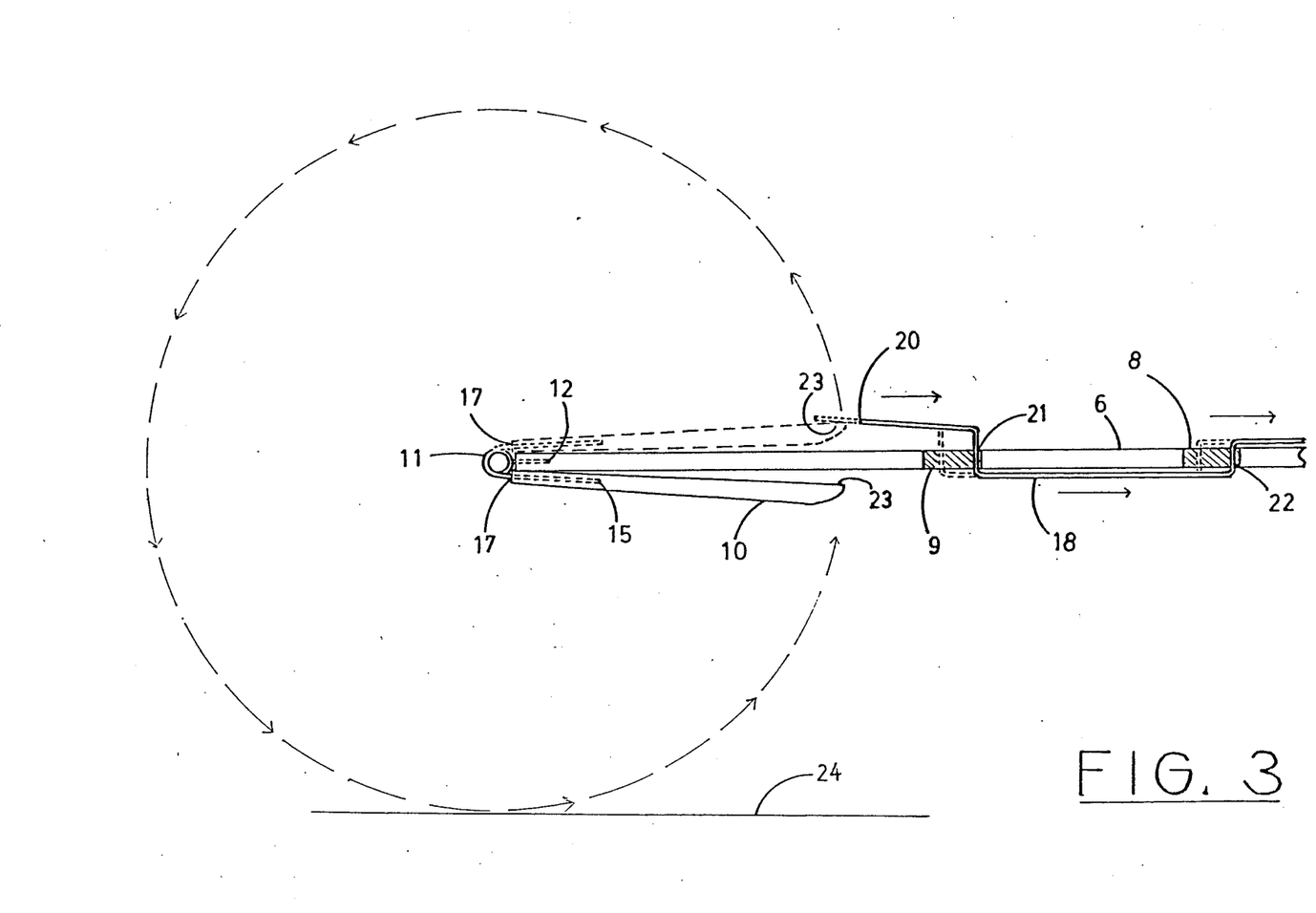
FIG. 3 is a fragmentary side view partly in elevation and partly in section of the swatting element end of the device, showing the major portion of the restraint-release element and depicting the maximum range of spring-powered arc of the swatting element.
Figure 4:
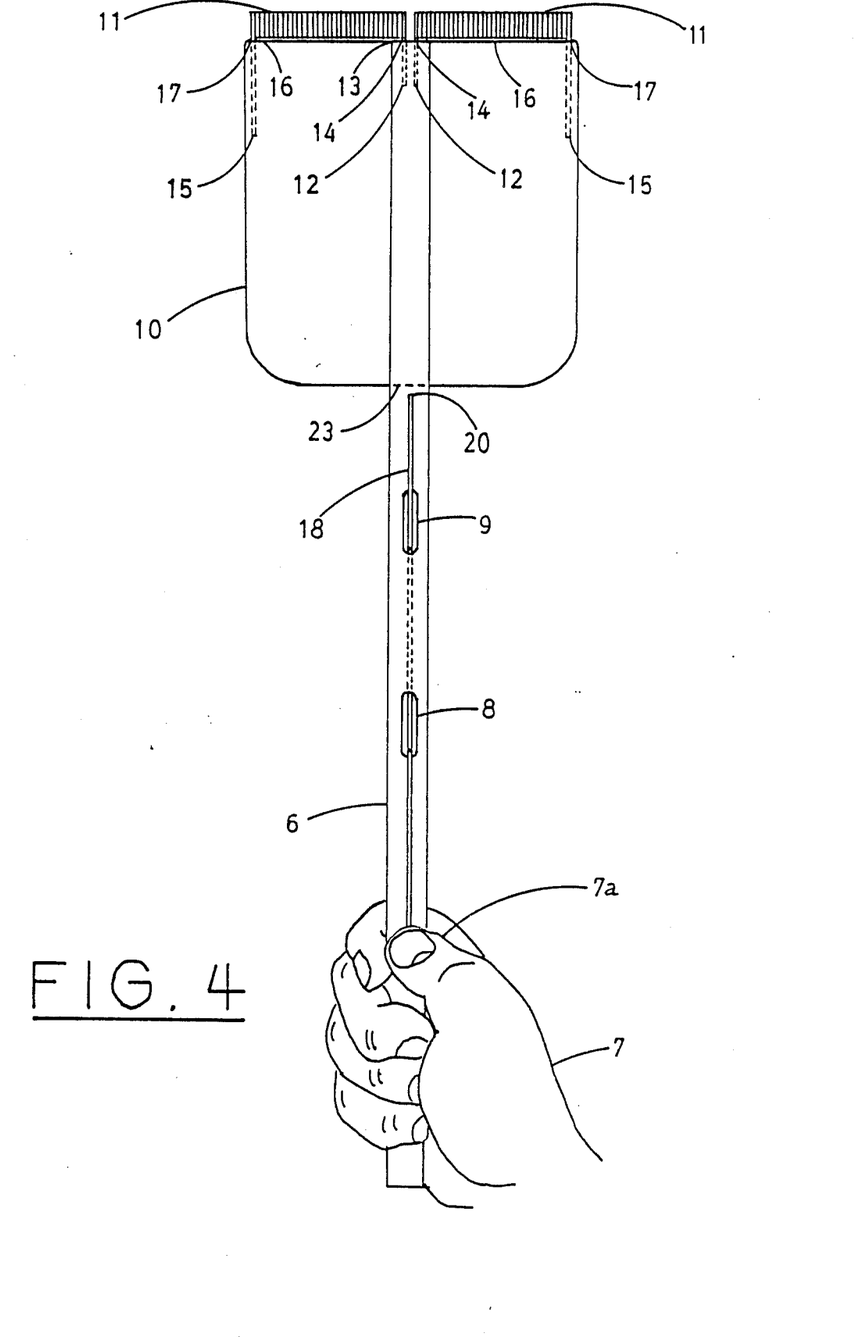
FIG. 4 is a top plan view showing the restraint-/release element in a retracted position and the swatting element positioned on the far side of the handle in its post-swat position.

In operation, the user grasps the end of handle 6, placing the thumb 7a on loop 19 and retracting restraint/release rod 18 away from swatting element 10 until rod 18 is impeded by the rearward ends of slots 8 and 9, as seen at points 21 and 22 of FIG. 3. The retracted position is also shown in FIG. 4. The swatting element 10 is then manually rotated against spring tension with the user's other hand around the longitudinal axis of springs 11 from the position shown in FIG. 4 to the cocked or maximum spring tension position shown in FIGS. 1 and 2. The restraint/release rod 18 is then pushed toward the swatting element 10 with the user's thumb 7a to cause the free end 20 of rod 18 to overlap the nearmost edge 23 of swatting element 10, thus restraining it against the torque force of springs 11. The spring-loaded swatter is not swung at the insect, but is slowly and stealthily slid toward it on a firm surface and when the insect is within range of the swatting element 10, the restraint/release rod 18 is imperceptibly retracted toward the user by a slight movement of user's thumb 7a so that its free end 20 clears the swatting element edge 23. Unrestrained, the swatting element 10 snaps in a rapid, short-radius arc around the pivot action of springs 11 and under their continuous torque force, thereupon striking the insect against the surface on which it rests, killing it.

Figure 5:
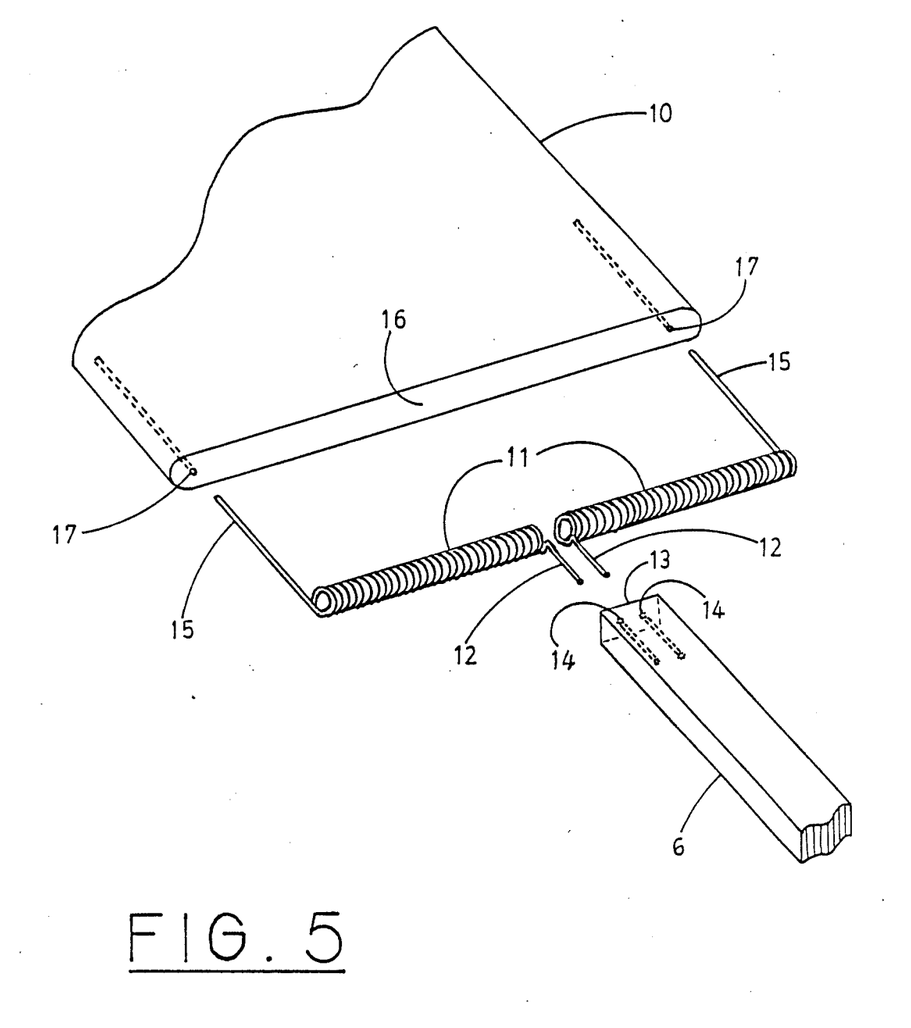
FIG. 5 is a fragmentary exploded perspective vie, in enlarged scale, shoving the method of connection of the springs to and between the handle and the swatting element.

The oppositely-wound featured of springs 11 provides precise lateral balance to the swat. Furthermore, because the swatting element 10 remains continuously under the torque force of the springs for a substantially full circle of its arc, in all circumstances the insect is struck while the swatting element is still under spring tension. This provides a surer, harder and quicker blow than heretofore in spring-powered swatters. This continuous spring tension feature, combined with the interposed location of springs 11 between handle 6 and swatting element 10 as seen in FIGS. 3 and 5, also allows the device to swat around corners under continuous spring power, to a distance equivalent to the length of the swatting element 10. A user can also utilize the fly swatter as a sweeper to sweep the dead insect from a horizontal swatting surface, shown at 24 in FIG. 3, by slightly raising the spring end of the handle sufficiently to allow the swatting element 10 to barely clear the swatting surface 24 and complete its spring-powered arc in a sweeping motion toward the user.

Since only the swatting element moves visibly, and even that in a rapid, short-radius arc at extremely close range to the fly, any motion apparent to the insect is instantaneous, thus resulting in a higher percentage of successful swats due to relative lack of warning.

The configuration of the ends 12 and 15 of springs 11 and the method of connection by their insertion into channels 14 in the handle and 17 in the swatting element, allows for their efficient removal and the substitution of spare springs having a greater or lesser strength. Not being coiled about any other part of the swatter, the springs are readily removable unless permanently affixed with adhesive or other affixing method.

All of the above improvements in function over the prior art, as well as the new capabilities described, are achieved in a swatter with fewer parts, simpler and cheaper to fabricate, assemble and use, than heretofore. By the use of material such as plastic in the swatting element and handle, the weight as well as the size and shape of the device can approximate that of a traditional manual fly swatter.

While the above description contains many specificities, these should not be construed as limitations on the scope of the invention, but rather as an exemplification of one preferred embodiment thereof. Many other variations are possible, for example one utilizing more or less than two springs or springs of a different type, one incorporating a catch-type restraint and release mechanism, or one utilizing a restraint or release member which is retained on the device by exterior affixation or through holes of a different configuration. Therefore the scope of the invention should be determined not by the embodiment illustrated but by the appended claims and their legal equivalents.

I claim:

1. An improved fly swatter comprising:
    (a) an elongated handle having proximal and distal ends;
    (b) a swatting element comprising a thin member having two major opposing surfaces;
    (c) spring means for pivoting said swatting element at said distal end of said handle in a given single-direction substantially full circle arc unimpeded at all points along said arc, and further providing continuous spring force on said swatting element regardless of the position of said swatting element in said arc, such that said spring means always urges said swatting element in a given rotational direction throughout said arc;
    (d) restraint means for engaging said swatting element and restraining it against the action of said spring means;
    (e) release means for releasing said restraint means to permit said swatting element to pivot on said spring means under the force of said spring means;
    thereby causing said swatting element to make sharp contact with a surface when said distal end of said handle is placed adjacent said surface.

2. The fly swatter of claim 1 wherein said spring means is interposed between said swatting element and said distal end of said handle.

3. The fly swatter of claim 1 wherein said spring means and said pivot are one and the same element.

4. The fly swatter of claim 1 wherein said restraint means and said release means are combined in a single slidable rod operatively affixed to said handle, said rod having both ends free.

5. An improved fly swatter comprising:
    (a) an elongated handle having proximal an distal ends;
    (b) a swatting element comprising a thin member having two major opposing surfaces;
    (c) unitary spring-pivot means for pivoting said swatting element unimpededly in a given single-direction substantially full circle arc under continuous spring force regardless of the position of said swatting element in said arc, such that said spring-pivot means always urges said swatting element in a given rotational direction throughout said arc;
    (d) restraint means affixed to said handle for engaging said swatting element and restraining it against the force of said spring-pivot means;
    (e) release means for releasing said restraint means, thereby permitting said swatting element to pivot under spring force on said spring-pivot means;
    thereby causing said swatting element to make sharp contact with a surface when said distal end of said handle is placed adjacent said surface.

6. The fly swatter of claim 5 wherein said unitary spring-pivot means is interposed between said swatting element and said distal end of said handle.

7. The fly swatter of claim 5 wherein said restraint means and said release means are combined in a single slidable rod operatively affixed to said handle, said rod having both ends free.

8. An improved fly swatter comprising:
    (a) an elongated handle having proximal and distal ends;

(b) a swatting element comprising a thin member having two major opposing surfaces;

(c) spring-pivot means comprising a spring element and a pivot in a unitary structure, said means being interposed between said swatting element and said distal end of said handle and for causing said swatting element to pivot unimpeded in one direction in substantially a full-circle arc under continuous spring force;

(d) restraint-release means operatively affixed to said handle for engaging said swatting element, restraining it against the force of said spring-pivot means, and subsequently releasing said element to pivotally move under the torque force of said spring-pivot means;

thereby causing said swatting element to make sharp contact with a surface when said distal end of said handle is placed adjacent said surface.

9. The fly swatter of claim 8 wherein said spring-pivot means comprises a pair of axially-aligned helical springs having straight inner ends, and said handle has receptacle channels at its said distal end for accepting said straight inner end of said spring.

10. The fly swatter of claim 8 wherein said spring-pivot means comprises a pair of axially-aligned helical springs having straight outer ends, and said swatting element has receptacle channels for accepting said straight outer ends of said springs.

11. The fly swatter of claim 8 wherein said restraint-release means comprises a single slidable rod having opposite ends, said rod being operatively affixed to said handle and having said opposite ends both free.

12. The fly swatter of claim 8 wherein said spring-pivot means comprises a pair of axiallyaligned helical springs which are oppositely-wound, one on a right-hand helix and the other on a left-hand helix, both springs having both of their ends protruding straight for a limited distance at a tangent from the circumference of their helix, and wherein said swatting element and said distal end of said handle both have receptacle channels for accepting and snugly holding said protruding spring ends, thereby pivotally connecting said swatting element to said distal end of said handle.

* * * * *